United States Patent
Robinson

(10) Patent No.: US 9,062,594 B2
(45) Date of Patent: *Jun. 23, 2015

(54) MULTI-STAGE TURBOCHARGER SYSTEM

(75) Inventor: Lee J. Robinson, West Yorkshire (GB)

(73) Assignee: Cummins Turbo Technologies Limited, Huddersfield (GB)

(*) Notice: Subject to any disclaimer, the term of this patent is extended or adjusted under 35 U.S.C. 154(b) by 819 days.

This patent is subject to a terminal disclaimer.

(21) Appl. No.: 12/951,400

(22) Filed: Nov. 22, 2010

(65) Prior Publication Data

US 2011/0123315 A1    May 26, 2011

(30) Foreign Application Priority Data

Nov. 21, 2009    (GB) .................................. 0920437.1

(51) Int. Cl.
| | |
|---|---|
| *F02B 37/007* | (2006.01) |
| *F02B 37/013* | (2006.01) |
| *F02B 37/00* | (2006.01) |
| *F02B 37/18* | (2006.01) |

(52) U.S. Cl.
CPC ............. *F02B 37/013* (2013.01); *F02B 37/004* (2013.01); *F02B 37/18* (2013.01); *F02B 37/183* (2013.01); *Y02T 10/144* (2013.01)

(58) Field of Classification Search
CPC ............................... F02B 37/013; F02B 37/18
USPC ................. 60/612, 602; 137/625.47; 123/562
See application file for complete search history.

(56) References Cited

U.S. PATENT DOCUMENTS

| | | | |
|---|---|---|---|
| 3,370,612 A * | 2/1968 | Holl .......................... | 137/625.47 |
| 4,930,315 A | 6/1990 | Kanesaka | |
| 5,142,866 A | 9/1992 | Yanagihara | |
| 5,408,979 A | 4/1995 | Backlund et al. | |
| 5,529,026 A * | 6/1996 | Kurr et al. ..................... | 123/41.1 |
| 5,893,392 A * | 4/1999 | Spies et al. ............... | 137/625.47 |
| 6,220,487 B1 * | 4/2001 | Srivastava et al. ............ | 222/380 |
| 6,237,857 B1 * | 5/2001 | Ausman et al. ................... | 239/5 |
| 6,298,868 B1 * | 10/2001 | Dean et al. .................. | 137/68.13 |

(Continued)

FOREIGN PATENT DOCUMENTS

| | | |
|---|---|---|
| DE | 3735736 A1 | 5/1989 |
| DE | 19514572 A1 | 10/1996 |

(Continued)

OTHER PUBLICATIONS

United Kingdom Search Report GB0920437.1, Cummins Turbo Technologies Limited, Mar. 7, 2011.

*Primary Examiner* — Thomas Denion
*Assistant Examiner* — Thomas Olszewski
(74) *Attorney, Agent, or Firm* — Taft Stettinius & Hollister LLP

(57) ABSTRACT

A turbocharger system comprises a first relatively small high-pressure (HP) turbocharger and a second relatively large low pressure (LP) turbocharger. The turbine of the LP turbocharger is connected in series downstream of the turbine of the HP turbocharger. A first exhaust bypass flow passage provides a bypass flow path around the HP turbine. A second exhaust bypass flow passage provides a bypass flow path around the LP turbine. A rotary valve is located at a junction of the first and second bypass flow passages and a first exhaust gas flow passage. The rotary valve comprises a valve rotor which is rotatable selectively to permit or block flow to the LP turbine and to permit or block flow to the first and second bypass paths.

24 Claims, 4 Drawing Sheets

(56) References Cited

U.S. PATENT DOCUMENTS

| | | | |
|---|---|---|---|
| 6,378,308 B1 | 4/2002 | Pfluger | |
| 6,378,509 B1 * | 4/2002 | Feucht et al. | 123/568.12 |
| 6,688,333 B2 * | 2/2004 | McLane et al. | 137/625.11 |
| 6,802,184 B2 * | 10/2004 | Huter et al. | 60/612 |
| 6,923,211 B2 * | 8/2005 | McLane et al. | 137/625.47 |
| 6,976,505 B2 * | 12/2005 | McLane et al. | 137/625.11 |
| 7,051,527 B2 | 5/2006 | Schmid | |
| 7,165,403 B2 | 1/2007 | Sun et al. | |
| 7,255,129 B2 * | 8/2007 | Lopez | 137/625.46 |
| 7,347,048 B2 | 3/2008 | Albat | |
| 7,963,951 B2 * | 6/2011 | Kitani et al. | 604/248 |
| 7,984,730 B2 * | 7/2011 | Ziv et al. | 137/625.46 |
| 8,011,186 B2 * | 9/2011 | McEwan et al. | |
| 8,235,709 B2 * | 8/2012 | Meagher et al. | 431/280 |
| 8,307,650 B2 * | 11/2012 | Robinson et al. | 60/612 |
| 2003/0074899 A1 | 4/2003 | Yamaguchi | |
| 2003/0121553 A1 * | 7/2003 | Kuo Liao | 137/625.47 |
| 2003/0188535 A1 | 10/2003 | Mader et al. | |
| 2004/0040300 A1 | 3/2004 | Klingel | |
| 2004/0134193 A1 | 7/2004 | Klingel | |
| 2006/0042247 A1 | 3/2006 | Haugen | |
| 2006/0070381 A1 | 4/2006 | Parlow | |
| 2006/0174620 A1 | 8/2006 | Albat | |
| 2007/0181185 A1 * | 8/2007 | Clark | 137/245 |
| 2012/0048411 A1 * | 3/2012 | Steyer et al. | 137/625 |
| 2012/0240572 A1 * | 9/2012 | Schorn et al. | 60/602 |

FOREIGN PATENT DOCUMENTS

| | | | |
|---|---|---|---|
| DE | 19740609 A1 | 12/1998 | |
| DE | 10222919 A1 | 12/2003 | |
| DE | 102005025885 A1 | 12/2006 | |
| DE | 10222919 B4 * | 12/2007 | F02D 37/00 |
| EP | 0864737 A1 | 9/1998 | |
| EP | 0949411 A2 | 10/1999 | |
| EP | 1258603 A1 | 11/2002 | |
| EP | 1375868 A1 | 1/2004 | |
| EP | 2 080 876 A2 | 7/2009 | |
| EP | 2 080 876 A3 | 6/2010 | |
| JP | 61200331 A | 9/1986 | |
| JP | 62265442 A | 11/1987 | |
| JP | 63009616 A | 1/1988 | |
| JP | 2005315163 A | 11/2005 | |
| JP | 2007-154684 A | 12/2005 | |
| JP | 2007154684 A | 12/2005 | |
| WO | 20047042206 A1 | 5/2004 | |
| WO | 2006089653 A1 | 8/2006 | |
| WO | 2007031752 A1 | 3/2007 | |
| WO | 2007098133 A1 | 8/2007 | |
| WO | 2008015397 A1 | 2/2008 | |
| WO | WO 2008/01544 A1 | 2/2008 | |
| WO | WO 2009/030914 A3 | 3/2009 | |
| WO | WO 2009030914 A2 * | 3/2009 | F02B 37/013 |

* cited by examiner

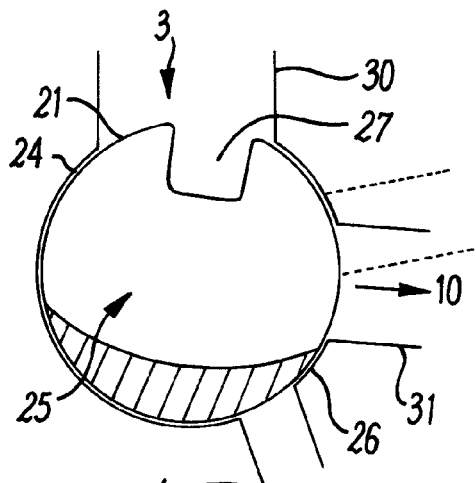
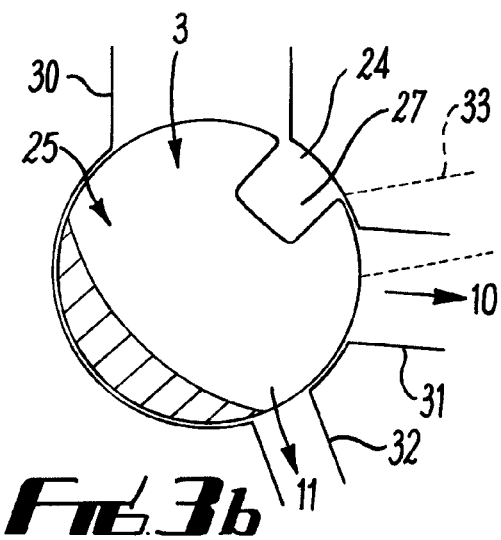
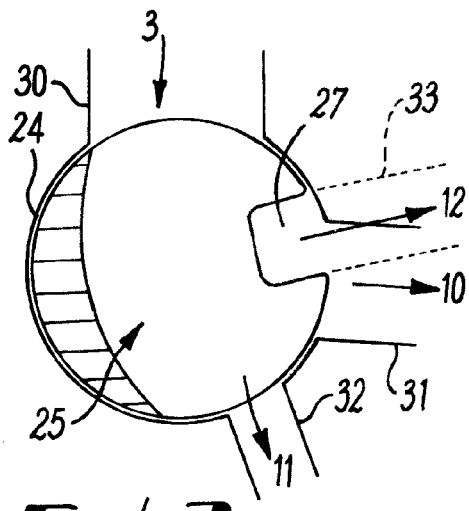
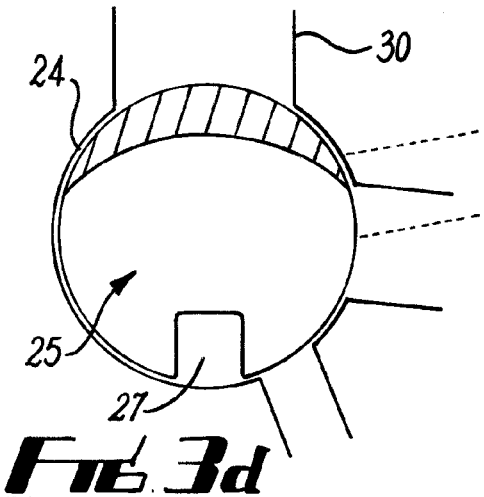
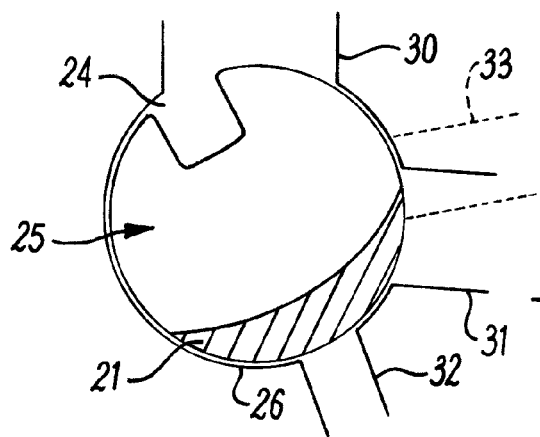

MULTI-STAGE TURBOCHARGER SYSTEM

CROSS REFERENCE TO RELATED APPLICATIONS

The present application claims priority to United Kingdom Patent Application No. 0920437.1 filed Nov. 21, 2009 which is incorporated herein by reference.

The present invention relates to a multi-stage turbocharger system. Particularly, but not exclusively, the present invention relates to a two-stage turbocharger system and a method for operating the same.

Turbochargers are well known devices for supplying air to the intake of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housings.

In known turbochargers, the turbine stage comprises a turbine chamber within which the turbine wheel is mounted; an annular inlet passageway defined between facing radial walls arranged around the turbine chamber; an inlet arranged around the inlet passageway; and an outlet passageway extending from the turbine chamber. The passageways and chambers communicate such that pressurised exhaust gas admitted to the inlet chamber flows through the inlet passageway to the outlet passageway via the turbine and rotates the turbine wheel. It is also known to improve turbine performance by providing vanes, referred to as nozzle vanes, in the inlet passageway so as to deflect gas flowing through the inlet passageway towards the direction of rotation of the turbine wheel.

Another known approach to improving turbocharging efficiency for an engine with a wide speed/load range is to provide a sequential two stage turbocharging system, comprising one relatively small high pressure (HP) turbocharger and another relatively large low pressure (LP) turbocharger. The turbochargers are arranged in series so that exhaust from the engine flows first through the smaller turbine of the HP turbocharger and then through the larger turbine of the LP turbocharger. A valve-controlled bypass path is provided for allowing exhaust gas to bypass the HP turbine for instance at high engine speeds and/or loads. Similarly, the compressors of the two turbochargers are also arranged in series, with air flowing first through the relatively large compressor of the LP turbocharger and then through the relatively small compressor of the HP turbocharger. Again, a valve controlled bypass is provided to allow the inlet air to bypass the compressor of the HP turbocharger for instance at high engine speeds and/or loads.

In a sequential two-stage turbocharging system disclosed in WO 2008/015400, exhaust gas flow through the HP turbine, LP turbine and HP bypass path is controlled by a single rotary valve which may be positioned upstream or downstream of the HP turbine. In more detail, a primary exhaust gas flow path comprises an inlet portion which delivers exhaust gas to the HP turbine and an intermediate portion which delivers exhaust gas from the HP turbine to the LP turbine. The bypass path communicates between the inlet portion of the primary flow path and the intermediate portion of the primary flow path. The exhaust gas flow control valve is a rotary valve located at a junction of the bypass path and the primary path (which may be the inlet portion of the primary path if the valve is upstream of the HP turbine, or the intermediate portion of the primary path if the valve is downstream of the HP turbine). The rotary valve comprises a valve rotator rotating in a valve chamber and operable to permit or block flow through the bypass path and/or the primary path that is again either the inlet or intermediate portions of the primary path depending on whether the valve is upstream or downstream of the HP turbine respectively. In one embodiment in which the valve is upstream of the HP turbine, the valve comprises an inlet port communicating with the inlet portion of the primary flow path, a primary outlet port communicating with the inlet portion of the primary flow path (so that flow to the HP turbine flows through the valve via the inlet port and primary outlet port), and a bypass port which provides an outlet to the bypass path which communicates with the inlet of the LP turbine (which may be via the intermediate portion of the primary flow path). In another embodiment in which the valve is downstream of the HP turbine, the valve comprises a primary inlet port communicating with the intermediate portion of the primary flow path, and a primary outlet port communicating with the LP turbine inlets (via the intermediate portion of the primary flow path), and a bypass inlet port communicating with the by pass path.

By rotation of the valve rotor to open, close or partially open/close individual ports the turbocharger system may be operated in various modes including a normal fired mode for modulating the exhaust gas flow to the HP and LP turbines, a braking mode (non-fired mode) in which the valve is operated to provide a braking back pressure in the exhaust system, and an exhaust gas heating mode (fired operating mode) in which the valve is operated to restrict exhaust gas flow to thereby heat the exhaust gas flow.

Embodiments of the sequential turbocharger system of WO 2008/015400 may include a wastegated LP turbine. The skilled person will appreciate that a wastegate is a valve controlled bypass flow path around the turbine.

It is an object of the present invention to provide an alternative or improved multi-stage turbocharger system.

According to the present invention there is provided a turbocharger system comprising: a primary inlet for flow communication with an exhaust gas manifold of an engine and an exhaust outlet; a first relatively small turbocharger having a first turbine with an inlet and an outlet; a second relatively large turbocharger having a second turbine with an inlet and an outlet; a primary exhaust gas flow path including an inlet portion for delivering exhaust gas to the inlet of the first turbine and an intermediate portion for delivering exhaust gas from the outlet of the first turbine to the inlet of the second turbine; a first bypass flow path in gas flow communication with the primary inlet and the inlet of the second turbine thereby bypassing the first turbine; a second bypass flow path in gas flow communication with the primary inlet and the exhaust outlet thereby bypassing the second turbine; and an exhaust gas flow control valve operable to: permit or prevent selectively exhaust gas flow through the primary exhaust flow path; permit or prevent selectively exhaust gas flow through the first bypass path; and permit or prevent selectively exhaust gas flow through the second bypass path.

The turbocharger system according to the present invention has all of the functionality of the turbocharger system of WO 2008/015400 described above, but in addition the exhaust gas control valve is operable to select the exhaust gas flow to bypass the second turbine as well as the first turbine.

Accordingly, the valve is operable both as a first turbine bypass valve and also as a "wastegate" valve for the second turbine.

In preferred embodiments the valve rotor rotates within a valve chamber which may be provided in an inlet part of a housing of the first or second turbine or in a separate housing. The valve chamber may be provided at a junction of the primary inlet, the inlet portion of the primary exhaust gas flow path and the first and second bypass flow paths.

The exhaust flow control valve may be situated in the inlet portion of the primary exhaust gas flow path so as to permit or allow gas flow through the primary exhaust gas flow path by permitting or allowing gas flow through the inlet portion of the primary flow path.

The exhaust gas flow control valve may comprise: a primary inlet port communicating with the primary inlet; a primary outlet port communicating with the inlet portion of the primary flow path; a first bypass outlet port communicating with the first bypass path; and a second bypass outlet port communicating with the second bypass path.

The valve may operable in a first mode to block flow through the first and second bypass outlet ports, a second mode in which flow is permitted through the first bypass outlet port to allow at least a portion of the exhaust gas flow to bypass the first turbine alone, and a third mode in which flow is permitted through said second bypass outlet port to allow at least a portion of the exhaust gas flow to bypass both the first and second turbines.

In the third mode exhaust gas flow may be permitted through both the first and second bypass outlet ports.

When operating in said second mode the first bypass outlet port may be at least partially unobstructed and the second bypass outlet port may be fully obstructed.

In the third mode the first bypass outlet port may be fully unobstructed and the second bypass outlet port may be at least partially unobstructed.

In the third mode the second outlet port may be fully unobstructed. The primary inlet port may be at least substantially unobstructed in each said first, second and third modes.

The exhaust flow control valve may be a rotary valve comprising a valve rotor which is rotatable about a valve axis to block or unblock selectively said first and second bypass outlet ports.

The valve rotor may be rotatable between a first position in which both the first and second bypass outlet ports are fully blocked, a second position in which the first bypass outlet port is unblocked and the second outlet port is fully blocked, and a third position in which the first bypass outlet port is unblocked and the second bypass outlet port is at least partially unblocked.

When the rotor is in said third position the second bypass outlet port may be fully unblocked.

The rotor may be selectively positionable at a plurality of positions between said first and second positions. Similarly, the valve rotor may be selectively positionable at a plurality of positions between said second and third positions.

The valve rotor may be selectively positionable at any position between said first, second and third positions.

The valve rotor may comprise an arcuate surface for blocking or at least partially blocking the first and second bypass outlet ports. The arcuate surface may form a sector of a cylinder. The valve rotor may have an opening for providing gas flow communication between the primary inlet port and one or both of the primary outlet port and the first bypass outlet port, and a recess in communication with the opening for alignment with the second bypass outlet port in the third position in order to provide communication between the primary inlet port and the second bypass outlet port. The rotor may be in the form of cylinder having an axis that defines the axis of rotation and with a portion cut away to define the opening.

The valve rotor may be in the form of a barrel or cylinder.

The recess, which may be in the form of a groove defined in the surface of the cylinder, is axially offset from the opening in the direction along the axis of rotation of the valve rotor. The groove may extend in a direction that is substantially parallel to the axis of rotation and it may be defined by an arcuate surface.

The second bypass outlet port may have a smaller maximum flow area than either the inlet port or the first bypass outlet port.

The intermediate portion of the primary exhaust gas flow path may communicate with the first bypass outlet path. In particular there may be a junction between the intermediate primary exhaust gas flow path and the first bypass outlet path, the junction being downstream of the first turbine and upstream of the second turbine.

The exhaust gas flow control valve may be housed within a housing of the second turbine.

The valve may be operable to move to an exhaust gas heating mode wherein the second bypass outlet port is blocked by the valve, the first bypass outlet port is at least partially blocked by the valve and the primary outlet port is at least partially blocked. In this position, and with fuel supplied to the engine, the exhaust gas temperature can be raised. The valve rotor may be rotatable about said axis into one of a plurality of positions in which the first bypass outlet port is at least partially obstructed and either the primary outlet port is at least partially obstructed to modulate the exhaust heating effect.

The valve may be operable to move to an engine braking mode wherein the primary inlet port is at least partially blocked and in which the engine is not fired. This produces a back pressure in the exhaust. The valve rotor may be rotatable about said axis into one of a plurality of positions in which the inlet port is at least substantially obstructed and at least one of the other ports is at least partially obstructed to modulate the braking effect. The primary inlet port may be fully obstructed.

The valve rotor may be housed within a housing which is separate to or integral with either one of the first and second turbine housings.

The first and second turbines may have a common turbine housing, the valve rotor being housed within said common turbine housing upstream of the first turbine inlet.

The valve rotor may be rotatably supported at first and second ends thereof for rotation about said axis. An electric, pneumatic, hydraulic or other form of actuator may be provided for effecting rotation of the valve rotor. For instance the rotary valve or actuator may be adapted to receive control signals from a controller such as an engine control unit (ECU).

The turbocharger system may include at least one sensor from the following group, a sensor for detecting or determining the speed of rotation of the first turbine and/or the second turbine, a sensor for detecting or determining the boost pressure generated by the first and/or second turbocharger; a sensor for detecting or determining the back pressure in the exhaust gas bypass path; a sensor for detecting or determining pressure within the rotary valve chamber; a sensor for detecting or determining the rotational speed of an engine to which the turbocharger system is operably connected; and a sensor for detecting or determining load on an engine to which the turbocharger system is operably connected.

A turbocharged internal combustion engine including a turbocharger system according to the present invention may include an exhaust gas re-circulation system comprising a re-circulation gas flow path from an exhaust side to an air intake side of the engine, and an exhaust gas re-circulation valve provided in said path for controlling re-circulation of exhaust gas to the air intake side of the engine, wherein the rotary valve is operable to modulate back pressure in the exhaust gas flow to assist in the exhaust re-circulation.

The present invention also provides a turbocharger, comprising a turbine wheel mounted for rotation within a turbine chamber defined by a turbine housing, the housing defining a first inlet passage, a second passage communicating with said turbine chamber, a first bypass passage and a second bypass passage the first and second passages and the first and second bypass passages meeting at a junction, wherein a rotary valve is located at said junction, the rotary valve comprising a valve rotor which is rotatable about a valve axis to permit or block selectively exhaust gas flow to the first and second bypass passages from the inlet passage.

The first turbocharger may include a first air-compressor situated in a first air passage, and the second turbocharger may include a second air-compressor situated in said first air flow passage upstream of said first compressor. A bypass air flow passage may communicate with the first air flow passage upstream of the first air-compressor, and an air flow bypass valve may be operated to control the air flow through the first compressor and the bypass air flow passage.

The present invention also provides methods of operating the turbocharger system according to the present invention. Operating modes may include a normal fired mode for controlling the exhaust gas flow to the first and second turbines, a braking mode (non-fired mode) in which the rotary valve is operated to provide a braking back pressure in the exhaust system, and an exhaust gas heating mode (fired operating mode) in which the valve is operated to restrict exhaust gas flow to thereby heat the exhaust gas flow. In the exhaust gas heating mode, the turbocharger system may be part of a system comprising an exhaust after-treatment system.

According to one aspect of the invention there is provided a method of operating a turbocharger system as defined above, the method comprising: (i) operating the valve in a first mode to divert all exhaust gas flow through the first turbine; (ii) operating the valve in a second mode to allow at least a portion of the exhaust gas flow to bypass the first turbine; and (iii) operating the valve in a third mode to allow exhaust gas flow to bypass the first turbine, and in addition allow at least a portion of the exhaust gas flow to bypass the second turbine.

In said second mode the valve may be operated to modulate the amount of exhaust gas flow allowed to bypass the first turbine.

The valve may be operated in said third mode to control boost pressure generated by the second turbocharger.

The valve may be operated in said third mode to allow exhaust gas flow to bypass the second turbine when the boost pressure generated by the second turbocharger reaches a predetermined limit.

The valve may be operated in said third mode to control the rotational speed of the second turbocharger.

The valve may be operated in said third mode when the rotational speed of the second turbocharger reaches a predetermined limit.

Specific embodiments of the present invention will now be described, by way of example only, with reference to the accompanying drawings, in which:

FIGS. 3a-3e are schematic cross-sections through an exhaust gas control valve of the two-stage turbocharging system of FIG. 1, showing the valve of FIG. 2 in different positions for different modes of operation of the system;

Figure 2:
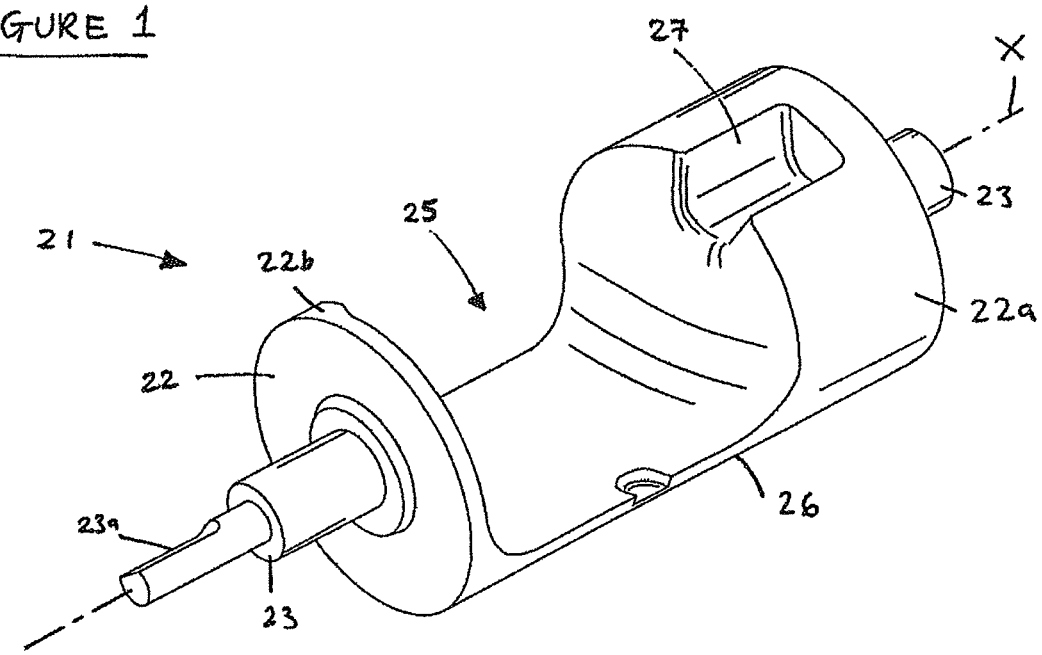
FIG. 2 is a perspective illustration of a valve rotor according to an embodiment of the present invention.
Figure 4:
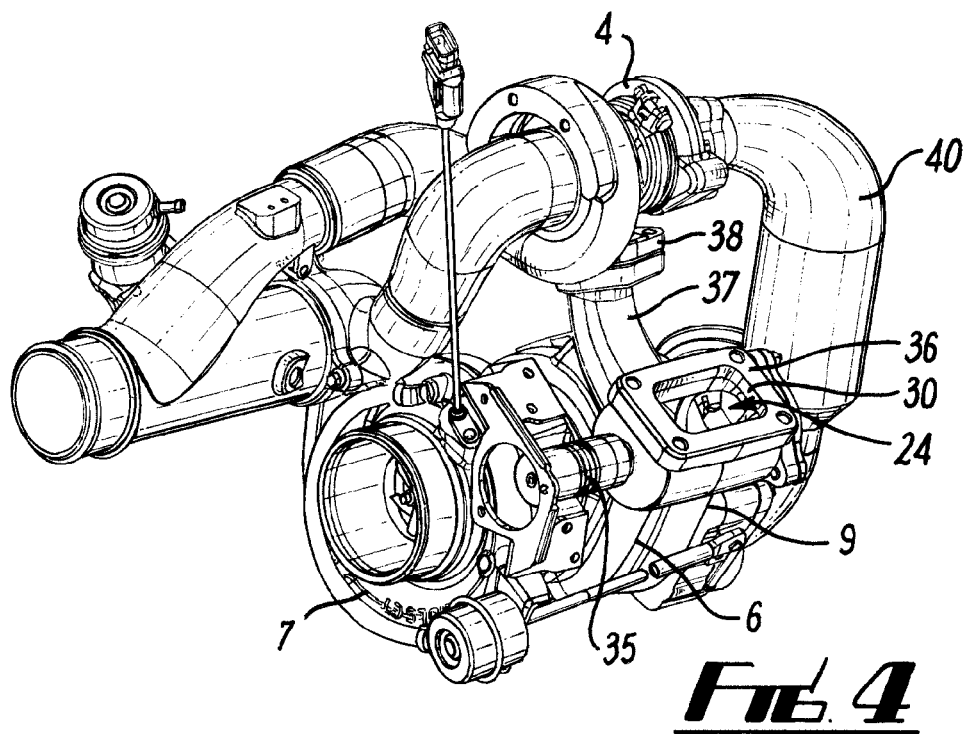
Figure 5:
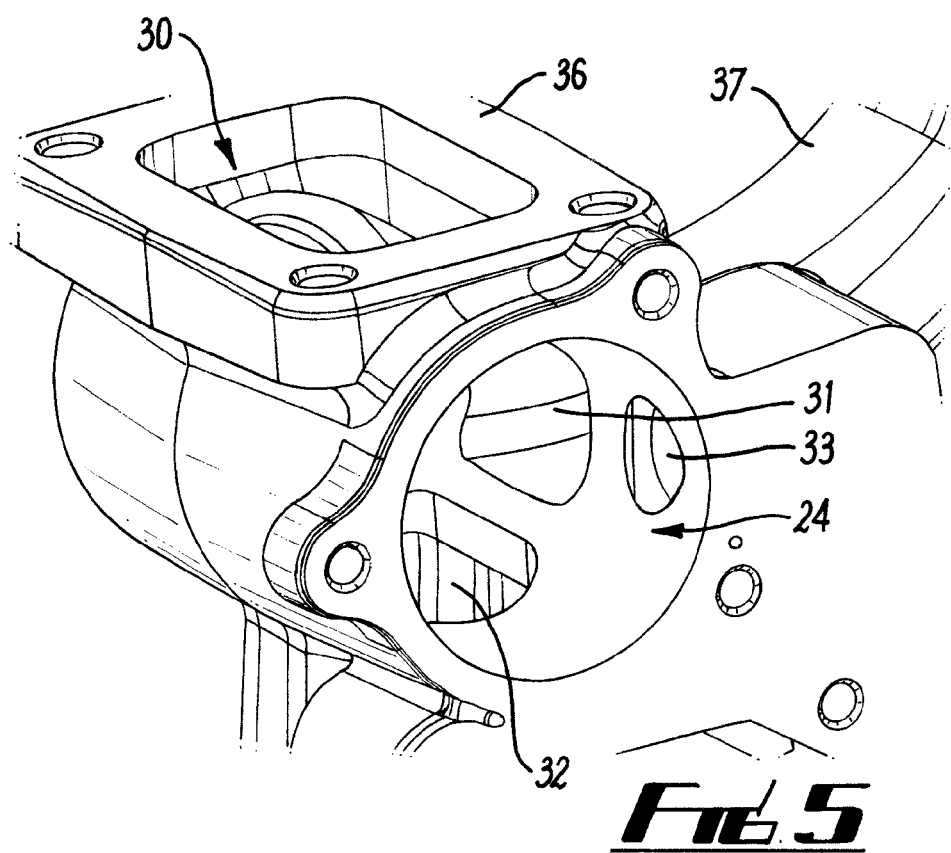
Figure 6A:
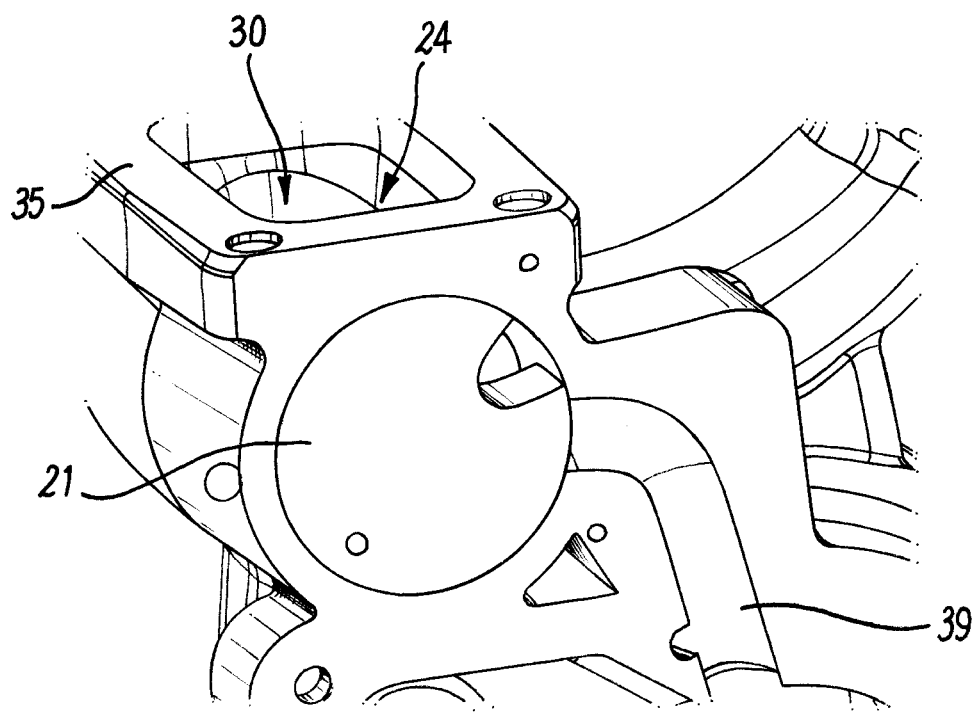
Figure 6B:
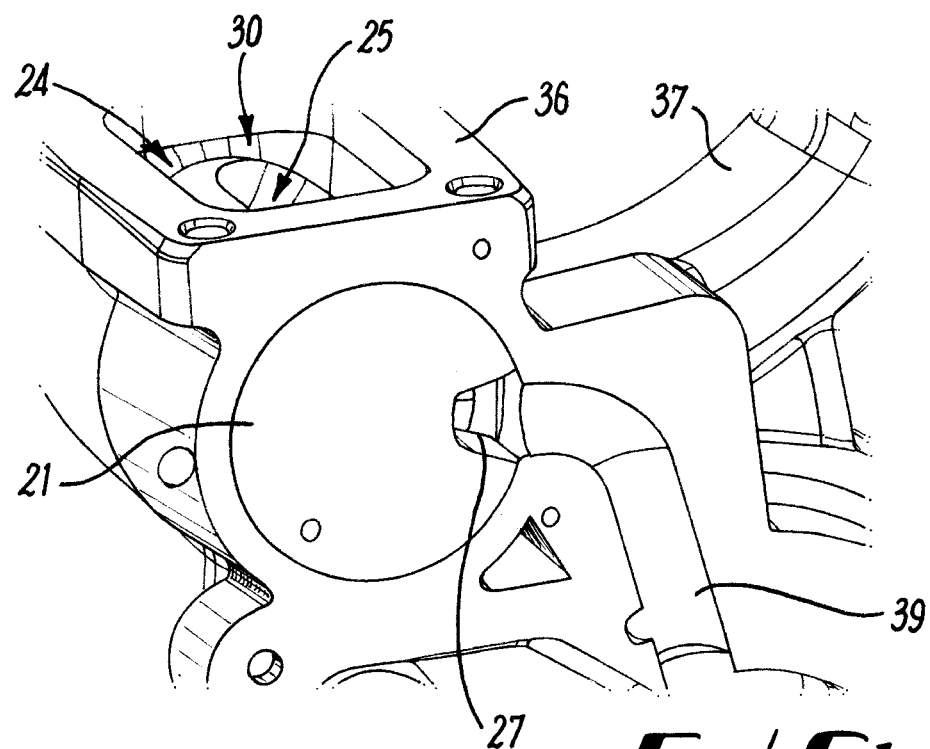

FIG. 4 is a perspective view of the two-stage turbocharging system in accordance with the present invention FIG. 5 is a perspective view of part of the system of FIG. 4, illustrating a chamber in which the valve rotor of FIG. 2 is rotatably disposed; and FIGS. 6a and 6b are perspective end views of FIG. 5 with the valve rotor in place and partially cut away to illustrate a wastegate passage, the valve rotor being shown in different positions.

Figure 1:
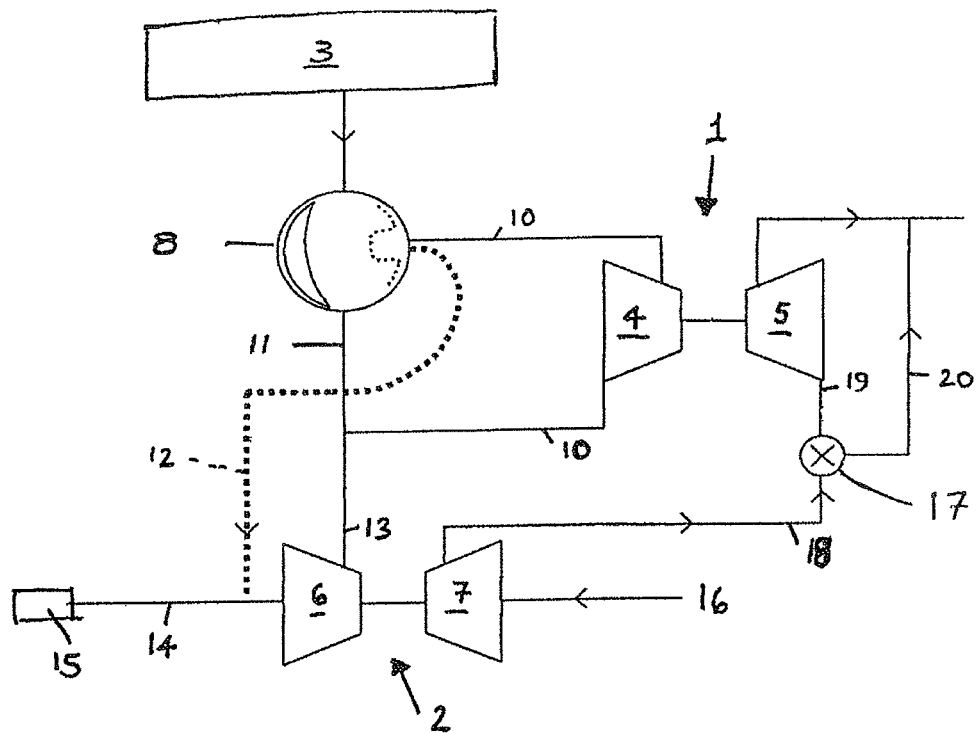
FIG. 1 is a schematic illustration of a two-stage turbocharging system according to a first embodiment of the present invention.

Referring first to FIG. 1, the schematically illustrated sequential two-stage turbocharging system comprises a relatively small high pressure (HP) turbocharger 1 and a relatively large low pressure (LP) turbocharger 2 connected in series to the exhaust manifold 3 of an internal combustion engine (not shown) such as a diesel engine. The HP turbocharger 1 comprises a relatively small exhaust turbine 4 and a relatively small compressor 5. The LP turbocharger 2 comprises a relatively large exhaust turbine 6 and a relatively large compressor 7.

An exhaust gas flow control valve 8 is located within the LP turbine housing 9 (see FIGS. 4-6) of the low pressure turbocharger 2 to control exhaust gas flow to the LP turbine inlet. The exhaust flow control valve 8 is operable to control flow exhaust gas flow from the manifold 3 via three possible flow paths 10, 11, 12. A first, primary, exhaust gas flow path 10 delivers exhaust gas from the exhaust manifold 3 to a LP turbine inlet path 13 via the HP turbine 4 and control valve 8. A first bypass flow path 11 delivers exhaust gas from the exhaust manifold 3 to the LP turbine inlet path 13 via valve 8 only, thus bypassing the HP turbine 4. A second bypass flow path 12 delivers exhaust gas from the exhaust manifold to an exhaust outlet path 14 of the LP turbine 6, thereby bypassing both the HP and LP turbines in a manner of a wastegate.

Exhaust gas (that leaves the LP turbine 6 or flows through the bypass flow path 12) in the exhaust outlet path 14 may be fed to a conventional exhaust system which may include a conventional exhaust after-treatment system 15. The after-treatment system 15 may be one of a variety of types of after-treatment system, including conventional systems generally known to one of ordinary skill in the art. Types of after-treatment systems contemplated include those designed to remove particulates, nitrogen-oxide compounds, and other regulated emissions.

As will be described in more detail below, the control valve 8 according to the present invention is operable to permit/block (and to modulate) exhaust gas flow to the LP inlet 13 from either the primary flow path 10 or the first bypass path 11. It is also operable to permit/block (and to modulate) exhaust gas flow to the LP turbine exhaust outlet path 14 via the second bypass path 12, thus allowing some or all of the exhaust gas to bypass both the HP turbine 4 and the LP turbine 6 in the manner of a wastegate.

The turbocharging system delivers compressed air to the engine (including any after cooler as appropriate) via an air inlet 16 to the LP compressor 7. An air flow control valve 17 is located between the compressor 7 of the LP turbocharger 2 and the compressor 5 of the HP turbocharger 1 to control the flow from the LP compressor outlet path 18 to the engine (after-cooler etc). The air flow control valve 17, which may for instance be a conventional butterfly valve (or other valve type such as a rotary valve, gate valve, flap valve, poppet etc), is operable to control air flow along two possible flow paths, a first flow path 19 via the HP compressor 5, and a second, bypass, flow path 20 which allows the air flow to bypass the HP compressor 5. The air flow control valve 17 can thus be controlled (for instance by the engine management system electronic control unit-ECU) to allow air flow to bypass the HP turbocharger 1 at the same time as the exhaust gas control valve 8 is operated to exhaust gas flow to the LP turbocharger 2 to bypass the HP turbocharger 1. This is described in more detail below.

In FIG. 1, the exhaust control valve 8 is represented in schematic cross-section. The valve 8 is shown in detail in FIG. 2 and comprises a valve rotor 21 having a main body 22 and end stub shafts 23 the valve rotor 1 rotates about the central longitudinal axis X within a substantially cylindrical valve chamber 24 (shown in detail FIGS. 4 and 5) defined within the LP turbine housing 9 at the junction of a passage that leads to the LP turbine inlet 13, the primary exhaust gas flow path 10 from the HP turbine 4, and the bypass flow paths 11, 12 from the exhaust manifold 3. The axis X extends generally transverse to the flow paths 10, 11 and 12. The main body 22 of the valve rotor 21 is formed as a cut-away cylinder, the cut out portion defining a valve passage 25 in the valve chamber 24. The radially outer surface 26 of the rotor forms an arc of a cylinder so as to rotate freely within the cylindrical valve chamber 24. This general form of valve is sometimes referred to as a rotary plug valve or barrel valve.

One end of one of the stub shafts 23 has a reduced diameter with a flat 23a for coupling to a suitable actuator (not shown in FIG. 2). The cut out valve passage 25 is offset in the axial direction along the main body 22 leaving cylindrical portions 22a and 22b at each end. The portion 22a is relatively thick and has a groove 27 in its outer surface that is in flow communication with the valve passage 25 and can be considered as an extension to that passage.

Rotation of the valve rotor 21 about the axis X rotates the valve passage 25 and brings the rotor outer surface 26 into alignment with valve ports of the paths 10, 11 and 12 respectively to block partially or completely the flow through the respective port/path. The rotation of the valve rotor 19 effectively rotates the valve passage 25 or the groove 27 into register with the ports to permit exhaust gas flow through the valve chamber 24 along one or more of the exhaust flow paths 10, 11 and 12, or to completely block the flow through the valve chamber 24.

Appropriate bearing arrangements (not shown) for mounting of the valve rotor 21 within the valve chamber 24, and appropriate valve actuating mechanisms (not shown), will be known to the skilled person. For instance the actuator may be an electric actuator, such as for example a stepper motor or other rotary electric actuator, or may comprise a pneumatic or hydraulic actuator or any other form of actuator. An actuator may be directly connected to one of the valve rotor stub shafts 23, or to a valve rotor spindle (not shown) which may extend from one of the shafts. The actuator may be directly connected to the rotor or connected to the rotor via a gear box or the like. Various possible coupling arrangements will be apparent to the appropriately skilled person.

The movement and positioning of the valve rotor will typically be controlled by the ECU, according to one or more control regimes. For instance, the position of the valve may be controlled in response to engine speed and/or load, the speed of the HP and/or LP turbines, or the boost pressure produced at the engine inlet manifold by the turbocharger system.

Exemplary modes of operation of the turbocharging system including the exhaust gas control valve 8 are described below with reference to FIGS. 3a to 3e. In these figures the valve rotor 21 and valve chamber 24 are shown schematically in cross-section profile. The valve chamber 24 has four ports, a single inlet port 30 and three outlet ports 31, 32, 33. The inlet port communicates with the engine exhaust manifold 3. A first outlet port 31 is in communication with the primary exhaust gas flow path 10 upstream of the HP turbine 4. A second outlet port 32 communicates with the first bypass path 11 downstream of the HP turbine 4 but upstream of the LP turbine 6. A third outlet port 33 is axially offset from the first two (and is therefore represented in dotted line) and communicates with the second bypass path 12 downstream of the LP turbine 6.

Referring first to FIG. 3a this illustrates a position of the valve rotor 21 and the valve passage 25 appropriate for exhaust flow control at low engine speeds and/or loads when there is low exhaust mass flow. The second and third outlet ports (for the first and second bypass exhaust gas flow paths) 32, 33 are closed by the outer surface 26 of the valve rotor 21 so that all of the exhaust gas flow from the engine manifold 3 flows along the primary exhaust gas flow path 10 to the inlet of the HP turbine 4 and then through the LP turbine. The air flow bypass valve 17 will also be closed, or substantially closed, to force air flow through the HP compressor 5 (in practice it is beneficial to close the compressor bypass valve 17 before the turbine bypass is closed to provide load on the HP compressor 5 which will prevent HP turbocharger over-speed as the turbine bypass is closed). The relatively small size of the HP turbine 4 means that the gas flowing through it reaches a relatively high speed and thus rotates the turbine 4 (and consequentially HP compressor 5) at a relatively high speed, thereby producing substantial boost pressure despite a relatively low exhaust mass flow rate. The relatively large size the LP turbine 6 means that it rotates very little so that the LP compressor 7 produces only marginal boost.

With the valve rotor 21 in the position shown in FIG. 3a, the division of work between the HP and the LP turbines 4, 6 is a function of the relative flow areas of each turbine. The HP turbine 4 is providing the majority of the work and operating at a much higher expansion ratio than the larger LP turbine 6. If engine speed and/or load increases with the valve rotor in the portion shown in FIG. 3a, the expansion ratio of both turbines will increase, but the HP turbocharger 1 will continue to provide most of the boost pressure (provided its effective expansion ratio limit is not exceeded).

As the engine speed and/or load increases, the valve rotor 21 may be rotated to uncover part, or all, of the second outlet port 32 for the first bypass exhaust gas path 11 to permit at least a portion of the exhaust gas flow to bypass the HP turbine 4. FIG. 3b illustrates the valve rotor rotated to a position in which the second outlet port 32 of the exhaust bypass gas path 11 almost completely uncovered but the third outlet port 33 for the second exhaust bypass gas path 12 remains covered. By controlling the position of the valve rotor 21 between the two extremes (port 32 fully closed as shown in FIG. 3a and fully open in which the rotor is rotated slightly clockwise compared to the position shown in FIG. 3b), it is possible in accordance with the present invention to modulate the bypass gas flow through the bypass gas path 11. For instance, as the engine speed begins to rise from a low speed and/or load condition, the valve rotor 21 may be rotated to begin to open the second outlet port 32 to permit some exhaust gas flow to bypass the HP turbine 4 so that an increasing amount of work is done by the LP turbocharger 2 as the engine speed and/or load rises.

The precise position of the valve rotor 21 may be controlled in accordance with a variety of different operating control strategies. For example, the valve 8 may be operated to maintain a particular expansion ratio across the HP turbine 4, either to maintain the HP turbine 4 at a constant expansion ratio or at an expansion ratio within an acceptable range for particular operating conditions of the engine. The valve 8 could alternatively or additionally be operated in order to maintain the HP turbine speed within a certain range, or below a certain maximum to prevent over-speed. According to another possible control strategy, the valve 8 could be operated to generate a desired boost pressure at the engine intake manifold or to maintain the boost pressure within a desired range (e.g. above a minimum and/or below a maximum). The provision of appropriate sensors, such as turbocharger speed or boost pressure sensors, to provide appropriate control signals to the ECU will be straightforward as will be appreciated by the appropriately skilled person. The sensors might typically include sensors for monitoring engine speed and/or load, turbocharger speed, boost pressure produced by each turbocharger, boost pressure generated at the engine intake and back pressure generated within the exhaust flow path upstream of the control valve 8.

As the engine speed and/or load rises and the valve rotor 21 is rotated further towards the position shown in FIG. 3b in which the first bypass gas path 11 is fully open, work done by the LP turbocharger 2 relative to the HP turbocharger 1 increases. Depending upon the particular control strategy for the bypass exhaust gas flow modulation, the overall pressure ratio of the turbocharger system may for instance rise or remain constant as the expansion ratio across the larger LP turbine 6 increases.

It will be appreciated that as the second outlet port 32 for the bypass exhaust gas path 11 is opened by rotation of the valve rotor 21, the HP compressor bypass valve 17 may also be opened as an increasing amount of boost is provided by the LP compressor. The overall boost pressure produced by the turbocharging system may rise, or may remain constant, as the bypass exhaust gas path 11 is opened depending upon the particular control regime for the control valve 8 and bypass valve 17.

At high engine load and/or speed, the valve rotor 21 is moved to the position shown in FIG. 3b in which the first bypass exhaust gas path 11 is almost fully open or slightly further clockwise so that it is fully open. The turbocharging system again functions effectively as a single turbocharger system, with virtually all of the work now being done by the larger LP turbocharger 2. At this point the HP compressor bypass valve 17 will typically be fully open to bypass the HP compressor 5. There will, however, still be some exhaust gas flow through the HP turbine 4 as there will be a pressure difference across it determined by the relative sizes of the flow passages 10 and 11. Although this would produce negligible work, it will nevertheless ensure that the HP turbine 4 continues to rotate to help provide a smooth transfer of work with little turbo-lag in the HP turbocharger 1 as engine conditions change and the valve 8 is operated to reduce the bypass flow, transferring compression work back to the HP turbocharger 1.

FIG. 3c shows the valve rotor 21 rotated to a position where the first bypass path 11 remains fully open and the groove 27 is aligned with the third outlet port 33 so that the second bypass path 12 is fully opened as well. It will be appreciated that by controlling the precise position of the valve rotor 21 to vary the degree to which the port 33 is uncovered (e.g. between the positions of FIGS. 3b and 3c) the opening of the second bypass path 12 can be controlled as required to limit the work done by the LP turbine 6 and therefore the boost pressure of the LP compressor 7. The second bypass path 12 thus affords a wastegate option in which gas bypasses both turbochargers 1, 2. It will be appreciated from this that the valve rotor 21 may be positioned so as to open the port 33 partially so that the wastegate bypass path 12 does not pass the entire exhaust gas flow, thereby allowing some exhaust gas to flow to the LP turbine 6 to generate boost pressure if required. As with operation of the valve described above in relation to FIGS. 3a and 3b, the position of the valve rotor 21 may be controlled via the ECU in accordance with any appropriate operating regime.

The present invention thus provides a multi-stage turbocharger system including an exhaust gas flow control valve 8 which can be operated precisely to modulate the exhaust gas flow to the HP and LP turbochargers 1, 2 in varied operating conditions, and in accordance with various possible control regimes. The functionality of a HP turbine bypass valve and an LP turbine wastegate are combined into a single control valve. This may be regarded as a normal fired mode operation of the turbocharging system according to the present invention. In accordance with the present invention the turbocharging system may in some embodiments be operated in one or both of two further modes, namely an engine braking mode and an exhaust gas heating mode.

Engine brake systems of various forms are widely fitted to vehicle engine systems, in particular to compression ignition engines (diesel engines) used to power large vehicles such as trucks. The engine brake systems may be employed to enhance the effect of the conventional friction brakes acting on the vehicle wheels or, in some circumstances, may be used independently of the normal wheel braking system, for instance to control down hill speed of a vehicle. With some engine brake systems, the brake is set to activate automatically when the engine throttle is closed (i.e. when the driver lifts his foot from the throttle pedal), and in others the engine brake may require manual activation by the driver, such as depression of a separate brake pedal.

In one form of conventional engine brake system an exhaust valve in the exhaust line is controlled to substantially block the engine exhaust flow when braking is required.

This produces an engine braking torque by generating a high backpressure that increases the work done on the engine piston during the exhaust stroke.

In accordance with an embodiment of the present invention, the exhaust flow control valve 8 can be operated to provide exhaust braking, obviating the need to provide a dedicated exhaust brake valve. When operating the exhaust gas control valve 8 in an engine braking mode in accordance with the present invention, the valve rotor 21 is rotated clockwise to block the port 30 from the engine exhaust manifold 3, and at least partially to block the port 31 that leads to the HP turbine 4 inlet as shown in FIG. 3d. Blocking the inlet to the HP turbine 4 obstructs exhaust gas flow through the turbocharger system thereby generating back pressure for engine braking.

The amount of back pressure generated can be modulated by appropriate control of the position of the valve rotor 21 to vary the degree to which the valve port 30 (and therefore flow to the HP turbine 4) is obstructed. It may be preferable to provide a path for a leakage flow to prevent back pressure exceeding a desired limit. Since in braking mode as illustrated in FIG. 3b the valve rotor 21 completely blocks flow to the inlet to the HP turbine 4, any gas flow through the turbocharger system in the engine braking mode will flow only through the LP turbine. This ensures that there will be reduced boost pressure generated during exhaust braking, and will also ensure that the HP turbocharger 1 cannot over-speed, bearing in mind that an exhaust brake is often applied when a vehicle is travelling long distances down hill during which there is only light load on the engine but very high engine speeds can be reached. It would also be possible to operate the control valve 8 in an engine braking mode by rotating the rotor 21 in the opposite direction so as to block the second outlet port 32 and at least partially block the port 31 that directs flow to the inlet of the HP turbine 4. However, this is less desirable for braking because of unwanted boost pressure that might be generated by the HP turbine and the potential risk of the HP turbine over speeding.

Whereas the exhaust braking mode is typically a non-fired operating mode (no fuel is supplied to the engine during exhaust braking), the control valve 8 may also be operated to restrict exhaust gas flow in a fired mode (in which fuel is supplied to the engine for combination) to raise exhaust gas temperature in order to regenerate a catalytic exhaust after-treatment.

Catalytic exhaust after-treatment system performance is directly related to the temperature of the exhaust gas that passes through it. For desired performance the exhaust gas temperature must be above a threshold temperature (typically lying in a range of about 250° C. to 370° C.) under all engine operating conditions and ambient conditions. Operation of the after-treatment system below the threshold temperature range will cause the after-treatment system to build up undesirable accumulations which must be burnt off in a regeneration cycle to allow the after-treatment system to return to designed performance levels. In addition, prolonged operation of the after-treatment system below the threshold temperature without regeneration will disable the after-treatment system and cause the engine to become non-compliant with government exhaust emission regulations.

For the majority of the operation range of a diesel engine for instance, the exhaust gas temperature will generally be above the required threshold temperature. However, in some conditions, such as light load conditions and/or cold ambient temperature conditions, the exhaust gas temperature can often fall below the threshold temperature.

In engine operating conditions, such as light load conditions, in which exhaust temperature might otherwise drop below the required threshold temperature the exhaust control valve can be operated in an exhaust gas heating mode to restrict exhaust gas flow thereby reducing the airflow cooling effect and increasing exhaust gas temperature.

FIG. 3e shows the position of the rotor appropriate to exhaust gas heating, which is a fired operating mode of the engine. Here the rotor 21 is positioned to block significant exhaust gas flow to the HP turbine 4 via the port 31 and to block flow to bypass path 11 to the LP turbine 6 via the outlet port 32. At the same time the compressor bypass valve 17 may be closed so that the incoming air flows through the HP compressor.

The effect of operating the valve in this way is to reduce the gas flow through the engine for any given fuel supply level (whilst maintaining sufficient air flow for combustion) in order to increase the exhaust gas temperature for instance to a level required for efficient operation and regeneration of a catalytic exhaust after-treatment system or for a separate regeneration operation. As mentioned above, this may for example be appropriate in such conditions as light load conditions and/or cold ambient temperature conditions. The heating effect can be modulated by precise control of the valve body 21 to vary the degree of obstruction of the outlet port 31 that leads to the HP turbine inlet.

As with other modes of operation of the exhaust control valve 8, the exhaust gas heating mode of operation of the valve 8 will typically be controlled by the ECU. For instance, the after-treatment system may include a temperature detector for determining the temperature within the system. The temperature detector may directly determine the temperature through a sensor, or may determine the temperature through calculations and/or iterations in an algorithm or software routine. The temperature detector may determine the temperature within the system and provide a signal to the ECU to facilitate control of the exhaust gas control valve 8 to effect a change in the exhaust gas temperature as needed. The temperature determination could be made within the after-treatment system itself, or at other locations such as the outlet of the LP turbine.

The temperature determinations may be made at regular time intervals, for example a plurality of closely timed intervals, or could for instance be effectively continuous. The ECU may be programmed to operate the exhaust control valve 8 in an exhaust gas heating mode whenever the temperature in the exhaust system is determined to have fallen below a threshold temperature.

An exemplary embodiment of the interconnected HP and LP turbochargers 1, 2 is shown in FIG. 4. The valve chamber 24, which is shown in more detail in FIG. 5, is integrally formed with a specially adapted LP turbine housing 9 and has an actuator 35 mounted to one side for connection to the valve rotor 21 (which is removed for clarity in FIG. 4). The inlet port 30 that receives exhaust gas from the engine exhaust manifold 3 is shown open and has a flange 36 for connection to a suitable duct (not shown). The HP and LP turbines 4, 6 are interconnected by a duct 37 that extends between the first outlet port 31 and HP turbine inlet port 38 and thus forms part of the primary exhaust gas path 10. The second outlet port 32 is diametrically opposite the inlet port 30 and communicates with the inlet 13 of the LP turbine 6. The third outlet port 33 is disposed alongside the first outlet port 31 but is axially offset therefrom and leads to a wastegate passage 39 defined in the LP turbine housing and forms part of the bypass path 12 that leads to the exhaust gas outlet 14 of the LP turbine. This passage can be seen in the cut-away view of FIGS. 6a and 6b in which the valve rotor 21 is shown in the valve chamber 24. The HP turbine 4 has an exhaust gas outlet that is connected by a duct 40 to the inlet 13 of the LP turbine 6.

FIGS. 6a and 6b illustrate the rotation of the valve rotor 21 between a first position which corresponds to that of FIG. 3b in which the port 33 that communicates the wastegate passage 39 (forming part of the second bypass path 12) is closed and a second position which corresponds to that of FIG. 3c in which the groove 27 in the valve rotor 21 is aligned with the port 33 so as to open the wastegate passage 39 to the flow of exhaust gas from the inlet port 30, thereby allowing it to bypass the HP and LP turbines 4,6.

The turbocharger system of the present invention may also be operated to assist exhaust gas recirculation (EGR). In an EGR system a portion of the exhaust gas taken from the exhaust manifold is reintroduced into the inlet manifold of the engine for further combustion with a view to reducing engine emissions. An EGR recirculation path allows a portion of the exhaust gas to flow the intake manifold of the engine via an EGR cooler. Flow through the exhaust recirculation path is controlled by an EGR control valve. The EGR control valve may be any one of a variety of conventional types commonly used in such an application, including butterfly valves, flap valves, rotary valves etc.

With modern highly efficient turbocharger systems, the boost pressure of the inlet manifold can often exceed the exhaust gas pressure at the exhaust manifold making the reintroduction of the recirculated exhaust gas to the inlet manifold problematical, for instance requiring dedicated EGR pumps etc. With the present invention, the exhaust gas control valve can be operated in such a way as to effectively reduce turbocharging efficiency below the maximum that could be achieved for any given engine operating condition in order to maintain back pressure at a level necessary to facilitate exhaust gas recirculation. In other words, the exhaust control valve 8 may be operated in such a way as to optimise engine intake and exhaust manifold conditions for exhaust gas recirculation in order to reduce emissions whilst at the same time minimising the air-fuel ratio for better fuel consumption.

The valve is conveniently located in, or adjacent to, the housing of the LP turbine. It will be appreciated that in alternative embodiments of the invention the exhaust flow control valve may be housed in a separate valve housing which is not part of either of the two turbochargers. Such an embodiment would for instance allow retrofitting of the control valve 8 to a two-stage turbocharging system. In other embodiments of the invention, the exhaust flow control valve could for instance be housed within the HP turbine housing. In yet other embodiments, the HP turbine and LP turbines may be combined in a common housing, the exhaust control valve being located within that common turbine housing.

Turbines may be of a fixed or variable geometry type. Variable geometry turbines differ from fixed geometry turbines in that the size of the inlet passageway can be varied to optimise gas flow velocities over a range of mass flow rates so that the power output of the turbine can be varied to suite varying engine demands. For instance, when the volume of exhaust gas being delivered to the turbine is relatively low, the velocity of the gas reaching the turbine wheel is maintained at a level which ensures efficient turbine operation by reducing the size of the annular inlet passageway. Turbochargers provided with a variable geometry turbine are referred to as variable geometry turbochargers.

In one known type of variable geometry turbine, an axially moveable wall member, defines one wall of the inlet passageway. The position of the member relative to a facing wall of the inlet passageway is adjustable to control the axial width of the inlet passageway. Thus, for example, as gas flow through the turbine decreases, the inlet passageway width may be decreased to maintain gas velocity and optimise turbine output. The variable geometry mechanism of the turbine may incorporate an array of vanes for directing the gas flow to the turbine wheel generally referred to in the art as "nozzle rings". Such vanes may move with the moveable wall member relative to a shroud plate having apertures in which the vanes are received or they may be fixed relative to the turbine housing and the moveable wall member may be in the form of a shroud that moves over the vanes.

Another known type of variable geometry turbine is the "swing vane" type. This comprises a variable guide vane array with adjustable guide vanes located in the turbine inlet passageway. Each vane is pivotable about a respective pivot axis extending across the inlet parallel to the turbine axis. A vane actuating mechanism is provided which is linked to each of the vanes and is displaceable in a manner which causes each of the vanes to move in unison, such a movement enabling the cross-sectional area of the inlet, and also the angle of approach of the gas turbine wheel, to be controlled.

Although two-stage turbocharging systems comprising fixed geometry turbines may in some respects provide an alternative to the use of relatively complex and expensive variable geometry turbochargers, one (or even both) of the turbochargers of a two stage turbocharging system according to the present invention could be a variable geometry turbocharger (of any type). This may be desirable for instance to further improve control over the turbocharging system and the ability to optimise turbocharging performance across a wide range of engine conditions.

In the above described embodiments of the invention there is a single HP turbine. However, it will be appreciated that a turbocharging system according to the present invention could for instance include two parallel HP turbines. For example, each of two HP turbines could receive an exhaust gas flow from a respective bank of cylinders from a multi-cylinder engine (for instance each receiving exhaust gas from one bank of a "V" configured engine).

In embodiments comprising more than one HP turbine, HP turbines can be linked to a common HP compressor or to separate respective HP compressors.

Alternatively, rather than providing two separate HP turbines to receive exhaust gas flow from two separate banks of engine cylinders, a single twin entry HP turbine could be included in a turbocharger system according to the present invention. Moreover, in a turbocharger system according to the present invention comprising one or more HP turbines, each of the HP turbines could be configured as a twin-entry turbine.

Similarly, it will be appreciated that a turbocharging system in accordance with the present invention could have more than one set of sequentially connected turbochargers operating in parallel. For instance, a first turbocharging system generally as described above could receive an exhaust gas flow from a first set of cylinders of a multi-cylinder combustion engine, and a second sequential turbocharging arrangement as described above could receive exhaust gas flow from a second set of cylinders of the engine (each "set" could comprise a single cylinder).

It will further be appreciated that the present invention is not limited to a two-stage sequential turbocharging system, but could be embodied in a turbocharging system comprising more than two turbine stages connected in series.

Other applications and modifications of the invention as described above will be apparent to the appropriately skilled person.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A turbocharger system comprising:
a primary inlet for flow communication with an exhaust gas manifold of an engine and an exhaust outlet;
a first relatively small turbocharger having a first turbine with an inlet and an outlet;

a second relatively large turbocharger having a second turbine with an inlet and an outlet;

a primary exhaust gas flow path including an inlet portion for delivering exhaust gas to the inlet of the first turbine and an intermediate portion for delivering exhaust gas from the outlet of the first turbine to the inlet of the second turbine;

a first bypass flow path in gas flow communication with the primary inlet and the inlet of the second turbine thereby bypassing the first turbine;

a second bypass flow path in gas flow communication with the primary inlet and the exhaust outlet thereby bypassing the second turbine; and an exhaust gas flow control valve operable to:
  i) permit or prevent selectively exhaust gas flow through the primary exhaust flow path;
  ii) permit or prevent selectively exhaust gas flow through the first bypass path;
  iii) permit or prevent selectively exhaust gas flow through the second bypass path;

wherein the exhaust flow control valve is situated in the inlet portion of the primary exhaust gas flow path so as to permit or allow gas flow through the primary flow path by permitting or allowing gas flow through the inlet portion of the primary flow path; and wherein the exhaust gas flow control valve comprises a primary inlet port communicating with the primary inlet; a primary outlet port communicating with the inlet portion of the primary flow path; a first bypass outlet port communicating with the first bypass path; and a second bypass outlet port communicating with the second bypass path.

2. A turbocharger system according to claim 1, wherein the valve is operable in a first mode to block flow through the first and second bypass outlet ports, a second mode in which flow is permitted through the first bypass outlet port to allow at least a portion of the exhaust gas flow to bypass the first turbine alone, and a third mode in which flow is permitted through said second bypass outlet port to allow at least a portion of the exhaust gas flow to bypass both the first and second turbines.

3. A turbocharger system according to claim 2, wherein in said third mode exhaust gas flow is permitted through both the first and second bypass outlet ports.

4. A turbocharger system according to claim 2, wherein when operating in said second mode the first bypass outlet port is at least partially unobstructed and the second bypass outlet port is fully obstructed.

5. A turbocharger system according to claim 2, wherein in said third mode the first bypass outlet port is fully unobstructed and the second bypass outlet port is at least partially unobstructed.

6. A turbocharger system according to claim 5, wherein in said third mode the second outlet port is fully unobstructed.

7. A turbocharger system according to claim 2, wherein the primary inlet port is at least substantially unobstructed in each said first, second and third modes.

8. A turbocharger system according to claim 1, wherein the exhaust flow control valve is a rotary valve comprising a valve rotor which is rotatable about a valve axis to block or unblock selectively said first and second bypass outlet ports.

9. A turbocharger system according to claim 8, wherein the valve rotor is rotatable between a first position in which both the first and second bypass outlet ports are fully blocked, a second position in which the first bypass outlet port is unblocked and the second outlet port is fully blocked, and a third position in which the first bypass outlet port is unblocked and the second bypass outlet port is at least partially unblocked.

10. A turbocharger system according to claim 9, wherein when the rotor is in said third position the second bypass outlet port is fully unblocked.

11. A turbocharger system according to claim 9, wherein the rotor is selectively positionable at a plurality of positions between said first and second positions.

12. A turbocharger system according to claim 9, wherein the valve rotor is selectively positionable at a plurality of positions between said second and third positions.

13. A turbocharger system according to claim 9, wherein said valve rotor is selectively positionable at any position between said first, second and third positions.

14. A turbocharger system according to claim 8, wherein the valve rotor comprises an arcuate surface for blocking or at least partially blocking the first and second bypass outlet ports, an opening through the rotor for providing gas flow communication between the primary inlet port and one or both of the primary outlet port and the first bypass outlet port, and a recess in communication with the opening for alignment with the second bypass outlet port in the third position in order to provide communication between the primary inlet port and the second bypass outlet port.

15. A turbocharger system according to claim 14, wherein the recess is offset from the opening in the direction along the axis of rotation of the valve rotor.

16. A turbocharger system according to claim 1, wherein the second bypass outlet port has a smaller maximum flow area than either the inlet port or the first bypass outlet port.

17. A turbocharger system according to claim 1, wherein the intermediate portion of the primary exhaust gas flow path communicates with the first bypass outlet path.

18. A turbocharger system according to claim 1, wherein the exhaust gas flow control valve is housed within a housing of the second turbine.

19. A turbocharger system according to claim 1, wherein the valve is operable to move to an exhaust gas heating mode wherein the second bypass outlet port is blocked by the valve, the first bypass outlet port is at least partially blocked by the valve and the primary outlet port is at least partially blocked.

20. A turbocharger system according to claim 1, wherein the valve is operable to move to an engine braking mode wherein the primary inlet port is at least partially blocked.

21. A method of operating a turbocharger system wherein the system has a first relatively small turbocharger with a first turbine, a second relatively large turbocharger having a second turbine, a primary exhaust gas flow path for delivering exhaust gas to an inlet of the first turbine and an intermediate portion for delivering exhaust gas from an outlet of the first turbine to an inlet of the second turbine, a first bypass flow path in gas flow communication for bypassing the first turbine, a second bypass flow path for bypassing the second turbine; and an exhaust gas flow control valve having a primary inlet port for communication with an exhaust gas manifold of an engine, the method comprising operating the valve to occupy a position where the primary inlet port is at least partially blocked; wherein the second bypass flow path delivers exhaust gas from the exhaust gas manifold of the engine to an exhaust gas outlet path of the second turbine.

22. A method of operating a turbocharger system, the system having a first relatively small turbocharger with a first turbine, a second relatively large turbocharger having a second turbine, a primary exhaust gas flow path for delivering exhaust gas to an inlet of the first turbine and an intermediate portion for delivering exhaust gas from an outlet of the first turbine to an inlet of the second turbine, a first bypass flow path in gas flow communication for bypassing the first turbine, a second bypass flow path for bypassing the second turbine; and an exhaust gas flow control valve having a primary outlet port in communication with an exhaust gas manifold of an engine, a first bypass outlet port in communication with the first bypass path and a second bypass outlet port in communication with the second bypass path; the method comprising operating the valve to occupy a position in which the second bypass outlet port is blocked, the first bypass outlet port is at least partially blocked by the valve and the primary outlet port is at least partially blocked; wherein the second bypass flow path delivers exhaust gas from the exhaust gas manifold of the engine to an exhaust gas outlet path of the second turbine.

23. A turbocharger system comprising:
 a primary inlet for flow communication with an exhaust gas manifold of an engine and an exhaust outlet;
 a first relatively small turbocharger having a first turbine with an inlet and an outlet;
 a second relatively large turbocharger having a second turbine with an inlet and an outlet;
 a primary exhaust gas flow path including an inlet portion for delivering exhaust gas to the inlet of the first turbine and an intermediate portion for delivering exhaust gas from the outlet of the first turbine to the inlet of the second turbine;
 a first bypass flow path in gas flow communication with the primary inlet and the inlet of the second turbine thereby bypassing the first turbine;
 a second bypass flow path in gas flow communication with the primary inlet and the exhaust outlet thereby bypassing the second turbine; and
 an exhaust gas flow control valve situated in the inlet portion of the primary exhaust gas flow path and having:
 a primary inlet port communicating with the primary inlet; a primary outlet port communicating with the inlet portion of the primary flow path; a first bypass outlet port communicating with the first bypass path; and a second bypass outlet port communicating with the second bypass path; and
 an exhaust gas flow control valve,
 wherein the exhaust gas flow control valve is selectively operable in each of the following states:
  (i) a first state to permit flow through the primary outlet port but block flow through the first and second bypass outlet ports;
  (ii) a second state to permit flow through the primary outlet port and the first bypass outlet port but block flow through the second bypass outlet port, to allow at least a portion of exhaust gas flow to bypass the first turbine alone;
  (iii) a third state to permit flow through said first bypass outlet port and said second bypass outlet port to allow at least a portion of the exhaust gas flow to bypass both the first and second turbines;
  (iv) a fourth state to block flow through each of the primary outlet port, first bypass port and second bypass port; and
  (v) a fifth state to block flow through the first and second bypass outlet ports and to partially block flow through the primary outlet port.

24. A method of operating a turbocharger system which comprises:
 a primary inlet for flow communication with an exhaust gas manifold of an engine and an exhaust outlet;
 a first relatively small turbocharger having a first turbine with an inlet and an outlet;
 a second relatively large turbocharger having a second turbine with an inlet and an outlet;
 a primary exhaust gas flow path including an inlet portion for delivering exhaust gas to the inlet of the first turbine and an intermediate portion for delivering exhaust gas from the outlet of the first turbine to the inlet of the second turbine;
 a first bypass flow path in gas flow communication with the primary inlet and the inlet of the second turbine thereby bypassing the first turbine;
 a second bypass flow path in gas flow communication with the primary inlet and the exhaust outlet thereby bypassing the second turbine; and
 an exhaust gas flow control valve situated in the inlet portion of the primary exhaust gas flow path and having:
 a primary inlet port communicating with the primary inlet; a primary outlet port communicating with the inlet portion of the primary flow path; a first bypass outlet port communicating with the first bypass path; and a second bypass outlet port communicating with the second bypass path; and
 an exhaust gas flow control valve,
wherein the method comprises selectively operating the exhaust gas flow control valve in each of the following states:
  (i) a first state to permit flow through the primary outlet port but block flow through the first and second bypass outlet ports;
  (ii) a second state to permit flow through the primary outlet port and the first bypass outlet port but block flow through the second bypass outlet port, to allow at least a portion of exhaust gas flow to bypass the first turbine alone;
  (iii) a third state to permit flow through said first bypass outlet port and said second bypass outlet port to allow at least a portion of the exhaust gas flow to bypass both the first and second turbines;
  (iv) a fourth state to block flow through each of the primary outlet port, first bypass port and second bypass port; and
  (v) a fifth state to block flow through the first and second bypass outlet ports and to partially block flow through the primary outlet port.

* * * * *